May 2, 1933.   T. J. SMULSKI   1,907,221
ELECTRIC MOTOR
Filed Feb. 5, 1929   6 Sheets-Sheet 1
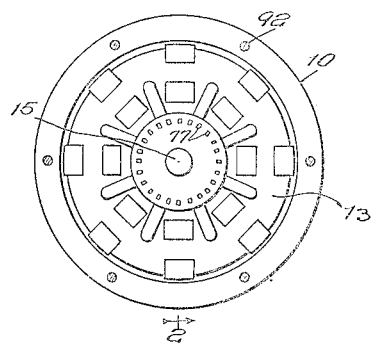
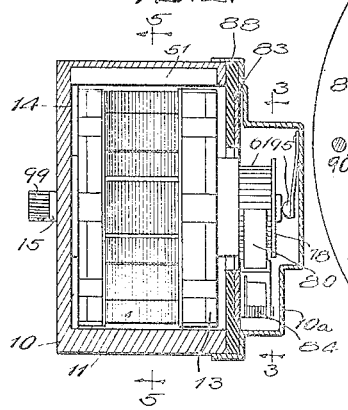
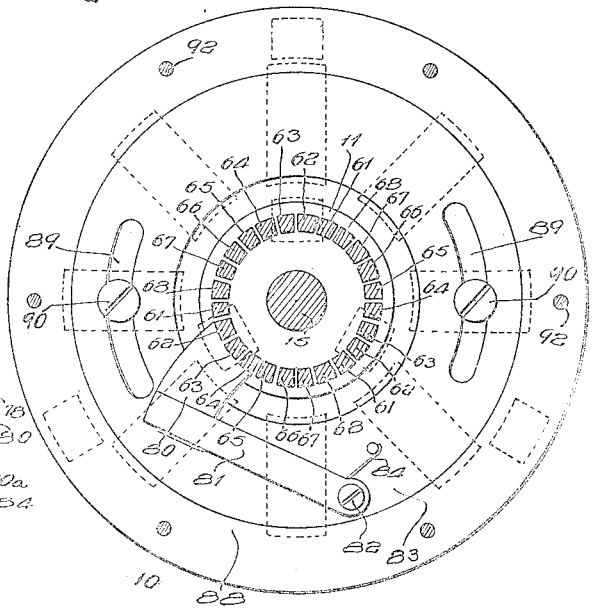
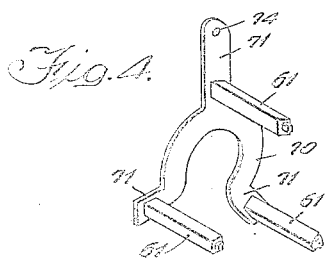

May 2, 1933.  T. J. SMULSKI  1,907,221
ELECTRIC MOTOR
Filed Feb. 5, 1929    6 Sheets-Sheet 2

Witness:
William P. Kilroy

Inventor:
Theodore J. Smulski
By Hill & Hill
Attys

May 2, 1933. T. J. SMULSKI 1,907,221
ELECTRIC MOTOR
Filed Feb. 5, 1929 6 Sheets-Sheet 3

Witness:
William G. Kilroy

Inventor:
Theodore J. Smulski
Hill & Hill Attys.

May 2, 1933.  T. J. SMULSKI  1,907,221
ELECTRIC MOTOR
Filed Feb. 5, 1929   6 Sheets-Sheet 4

Witness:
William P. Kilroy

Inventor
Theodore J. Smulski
by Hill & Hill

May 2, 1933.  T. J. SMULSKI  1,907,221
ELECTRIC MOTOR
Filed Feb. 5, 1929  6 Sheets-Sheet 5

Witness:  Inventor:
Theodore J. Smulski

May 2, 1933. T. J. SMULSKI 1,907,221
ELECTRIC MOTOR
Filed Feb. 5, 1929 6 Sheets-Sheet 6
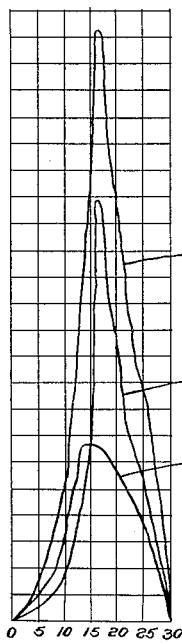
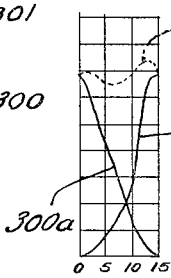
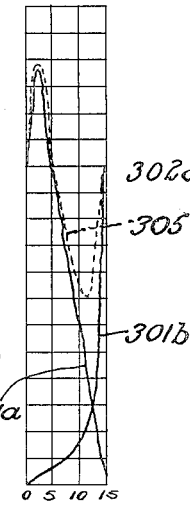
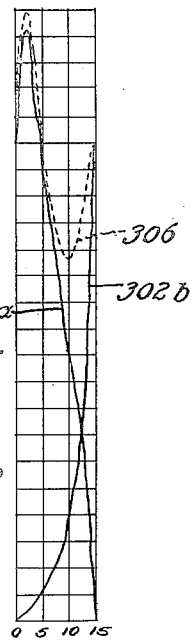
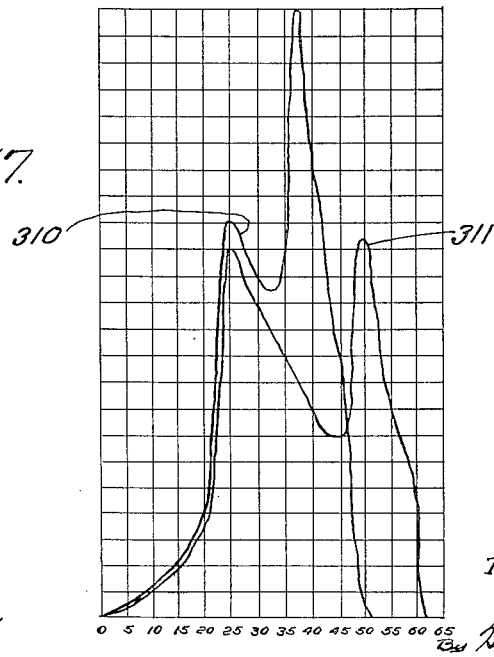
Witness:
William P. Kilroy
Inventor:
Theodore J. Smulski
By Hill & Hill Attys Patented May 2, 1933

1,907,221

UNITED STATES PATENT OFFICE

THEODORE J. SMULSKI, OF LAKE ZURICH, ILLINOIS, ASSIGNOR TO THE ANDERSON CO., OF GARY, INDIANA, A CORPORATION OF INDIANA

ELECTRIC MOTOR

Application filed February 5, 1929. Serial No. 337,604.

My invention relates to electric motors and has among its other objects the production of devices of the kind described which are compact, efficient, durable and satisfactory for use wherever found applicable.

Particular objects of the invention are to provide an improved motor which will develop a relatively large torque and will operate with a relatively high degree of efficiency as compared with other electric motors of the same type and of the same size or weight, or utilizing the same amount of power; to provide an electric motor which is relatively simple to manufacture and can be produced in commercial quantities at relatively low cost; to provide an improved electric motor which will operate on either direct or alternating current, and to provide an improved electric motor which can be manufactured in relatively small sizes and will have one or more of the characteristics and advantages set forth above.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings wherein like reference characters indicate like or corresponding parts.

Fig. 1 is an end elevation of an electric motor embodying my invention, a plate and a brush carried by the plate being removed from the motor so that other parts can be shown in detail;

Fig. 2 is a section taken on line 2—2 of Fig. 1;

Fig. 3 is an enlarged section taken on line 3—3 of Fig. 2;

Fig. 4 is a perspective view of a detail part of the commutator shown in Figs. 1, 2, and 3;

Figure 5:
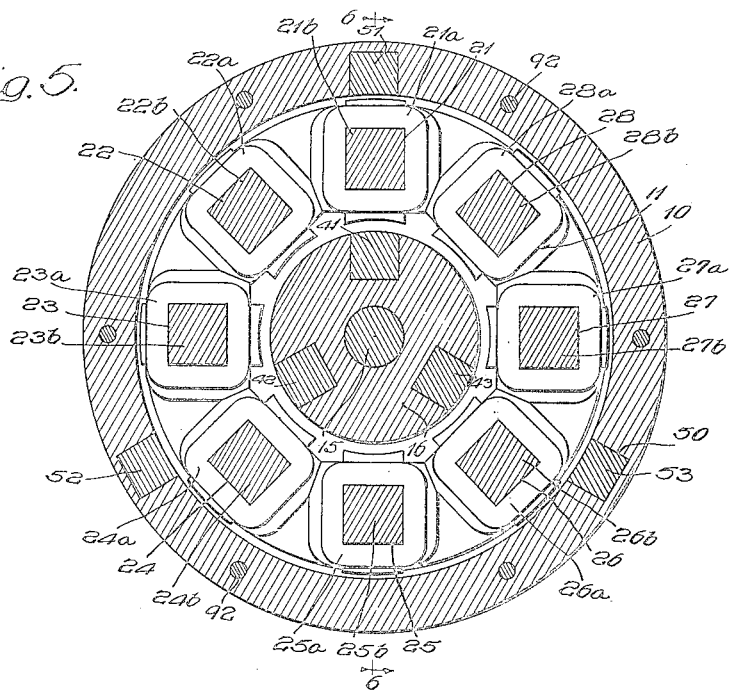
Figure 6:
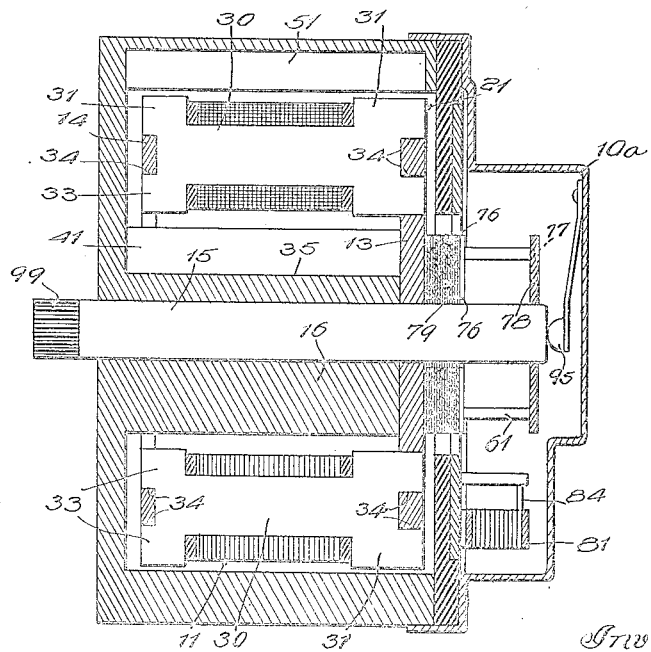
Figure 7:
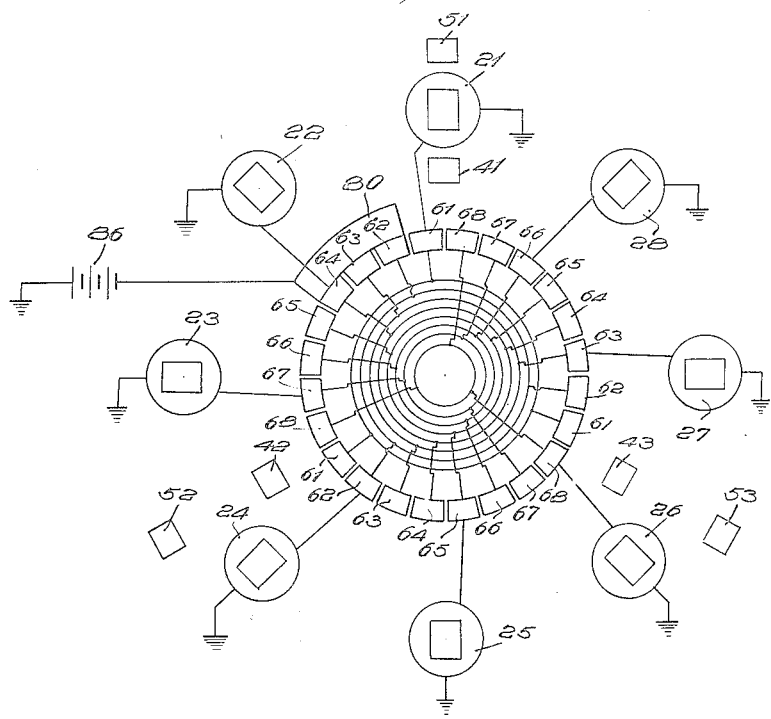
Figure 8:
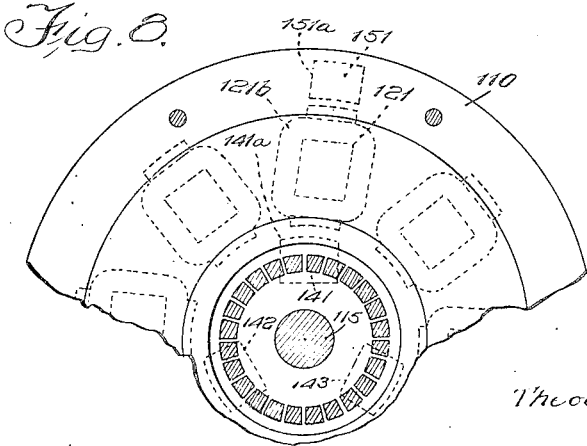
Figure 9:
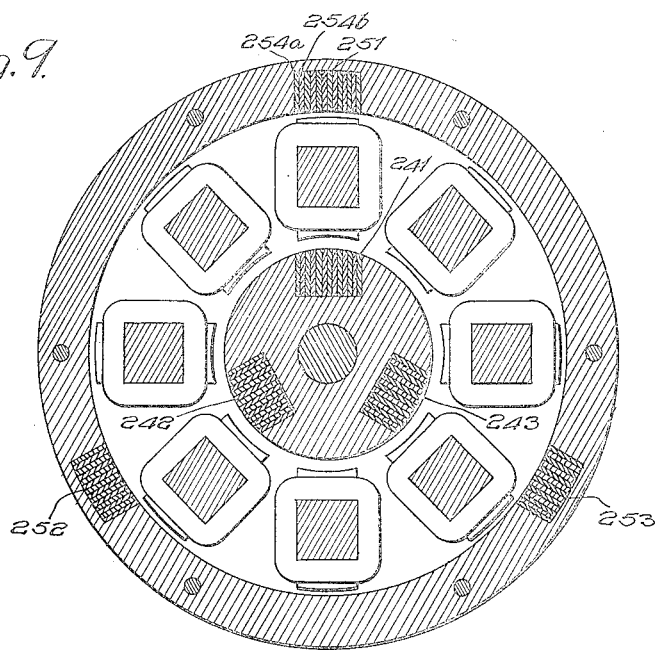
Figure 10:
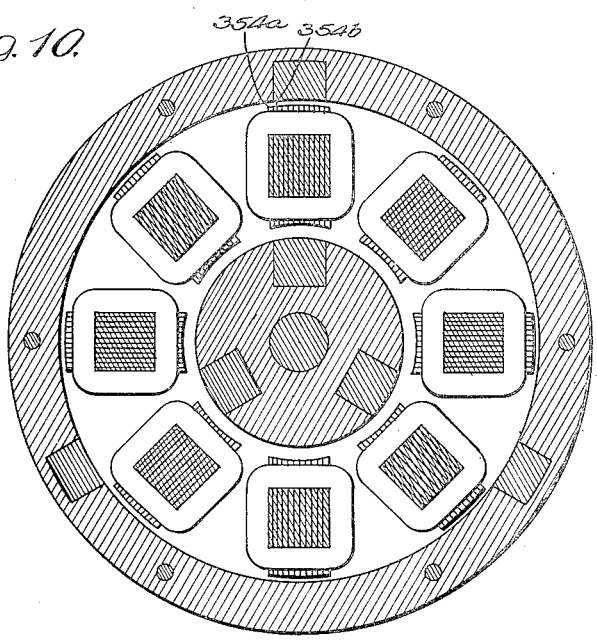
Figure 11:
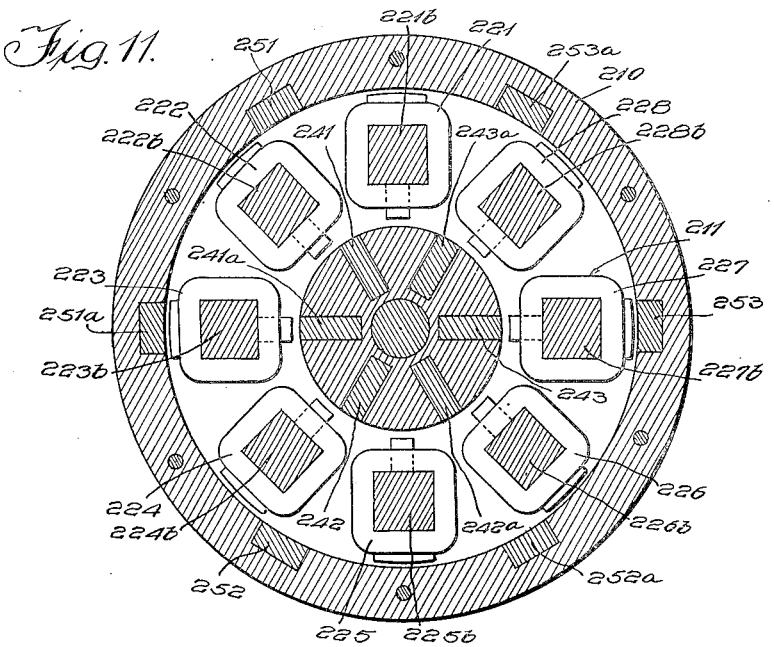
Figure 12:
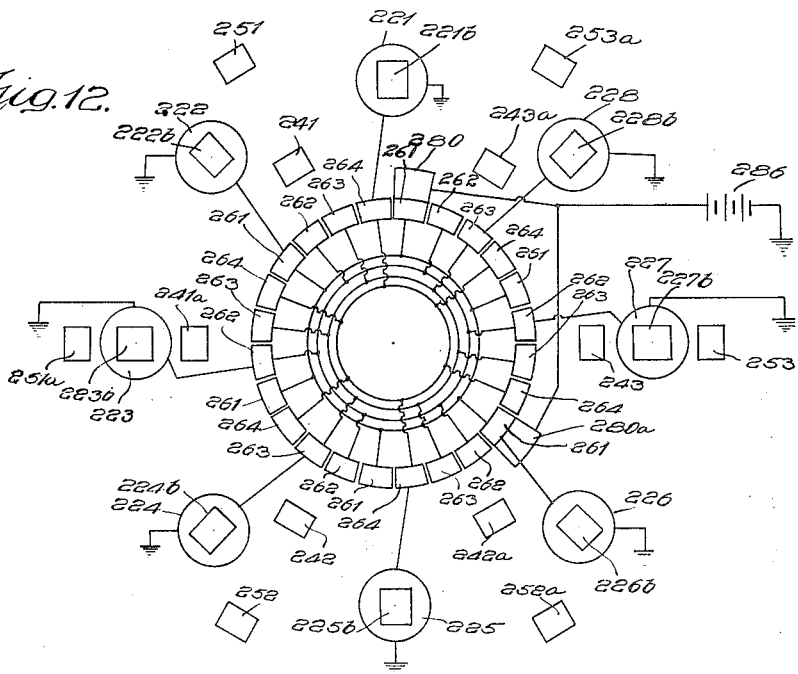

Fig. 4ᵃ is a section taken on line 4a—4a of Fig. 4;

Fig. 5 is an enlarged section taken on line 5—5 of Fig. 2;

Fig. 6 is a section taken on line 6—6 of Fig. 5;

Fig. 7 is a circuit diagram for the improved motor shown in Figs. 1 to 6, inclusive;

Fig. 8 is a fragmentary end elevation of an improved motor embodying another form of the invention;

Fig. 9 is a transverse section taken through a motor which embodies another form of the invention;

Fig. 10 is a transverse section taken through a motor which embodies another form of the invention;

Fig. 11 is a transverse section taken through a motor which embodies still another form of the invention;

Fig. 12 is a circuit diagram for the motor shown in Fig. 11, and

Figs. 13 to 17, inclusive, are diagrams illustrating certain features of my invention.

Referring for the present to Figs. 1 to 7, inclusive, wherein I have illustrated the details and circuit arrangement of a motor which embodies a preferred form of the invention, the reference character 10 identifies the housing of the motor constructed of non-magnetic material and the reference character 11 is applied in general to the armature thereof. As best shown in Figs. 2 and 6, the armature 11 preferably comprises a disc 13 and a ring or annulus 14, the disc and annulus being constructed of non-magnetic material. The disc 13 is preferably constrained to rotate with a shaft 15 which is rotatably journaled upon a boss 16 which, in this instance, is formed integral with the housing 10 (see Fig. 6). Extending between the annulus 14 and the disc 13 are eight electro-magnets which are identified by the reference characters 21 to 28, inclusive, the windings for the electro-magnets being identified by the reference characters 21a, 22a, 23a, 24a, 25a, 26a, 27a, and 28a, respectively. The cores of the electro-magnets are identified by the reference characters 21b, 22b, 23b, 24b, 25b, 26b, 27b and 28b and are constructed from some suitable magnetic material. As best illustrated in Fig. 6, each core is substantially I-shaped and comprises a central portion 30 upon which the winding is mounted. End pieces 31 formed integral with the portion 80 of each core are provided with lugs 33 which are seated in slots or apertures 34 formed in the annulus 14 and the disc 13. It will be noted that the electro-magnets 21 to 28, inclusive, are equidistantly spaced from each other and from the axis of rotation of the shaft 15.

Seated in the slots 35 formed in the boss 16 are three bars 41, 42, and 43, which bars are constructed from suitable magnetic material and are hereinafter referred to as the inner field bars. Seated in slots 50 formed in the housing 10 are bars 51, 52 and 53, the bars 51, 52 and 53 being formed of suitable magnetic material and being hereinafter referred to as the outer field bars. It will be noted that the bars 41, 42 and 43 are equidistantly spaced from the axis of rotation of the shaft 15 and that they are spaced 120° apart. Of course, the bars 51, 52 and 53 are also spaced 120° apart as they are aligned with the bars 41, 42 and 43, respectively.

Referring now to Figs. 3 and 7, it will be noted that the commutator comprises twenty-four bars, the bars being arranged in three sets. Thus, the commutator bars are numbered from 61 to 68, inclusive, but there are three bars 61 spaced 120° apart, three bars 62 spaced 120° apart, three bars 63 spaced 120° apart, etc. The bars 61 are electrically connected to each other, the bars 62 are electrically connected to each other, and the bars 63 are electrically connected to each other, etc. The means for connecting each set of three commutator bars to each other preferably comprises a plurality of bracket members 70, one of which is shown in perspective in Fig. 4. As illustrated in Fig. 4, each bracket member 70 comprises three lugs 71 to which the commutator bars are secured, the lugs 71 being provided with apertures 72 into which reduced ends 73 of the commutator bars are riveted. One of the lugs 71 is relatively long and is provided with an aperture 74 for a purpose which will presently appear. The reduced ends 73 of the commutator bars project through a disc 76 which is formed from electrical insulation (see Fig. 6) and lugs 77 formed at the other ends of the commutator bars pass through an insulating disc 78, the lugs 77 being riveted over to secure the disc to the commutator bars. The bracket members 70 are arranged around the shaft 15, but spaced therefrom, and are interposed between the insulating disc 76 and the disc 13, the eight bracket members 70 being insulated from each other and from the disc 13 by washers 79 which are preferably formed from relatively thin paper or any other suitable electrical insulation.

The apertures 74 in the elongated lugs 71 of the bracket members 70 provide means whereby the ends of the windings 21a to 28a, inclusive, are connected to the bracket members. Thus, the bracket member to which the commutator bars 61 are secured is electrically connected to one end of the winding 21a, the bracket member to which the commutator bars 62 are secured is electrically connected to one end of the winding 24a, the bracket member to which the commutator bars 63 are secured is electrically connected to one end of the winding 27a, the bracket member to which the commutator bars 64 are secured is electrically connected to one end of the winding 22a, the bracket member to which the commutator bars 66 are secured is electrically connected to one end of the winding 28a, the bracket member to which the commutator bars 67 are secured is electrically connected to one end of the winding 23 and the bracket member to which the commutator bars 68 are secured is electrically connected to the winding 26a. This arrangement is shown diagrammatically in Fig. 7 although the bracket members 70 are not illustrated in this figure. Instead, I have shown conductors for connecting each set of commutator bars to each other and have connected one of the commutator bars of each set to the proper winding. The other ends of the windings 21a to 28a, inclusive, may be grounded as indicated in Fig. 7. Thus, in practice, I have found it advantageous to connect these ends of the windings to cores 21b to 28b, inclusive, so that the housing 10, the shaft 15 and the cap or casing member 10a constitute the ground.

Engageable with the commutator bars is a brush 80 formed of any suitable material. The brush 80 is carried by a suitable holder 81 which is pivoted by a pin 82 to a disc 83. A helical spring 84 disposed around the pin 82 tends to displace the holder 81 in a clockwise direction (Fig. 3) to hold the brush 80 in engagement with the commutator. It will be noted that the portion of the commutator engaging the face of the brush is approximately 45° in width, that is, it subtends an arc of approximately 45° with respect to the axis of rotation of the shaft 15. As there are twenty-four commutator bars, each of the bars is approximately 15° in width but, of course, a relatively small space is left between adjacent bars. With this arrangement, it will be understood that at all times, at least three sets of commutator bars are electrically connected to the brush 80 and at other times, four sets of them are. As indicated diagrammatically in Fig. 7, the brush 80 is connected to the ground through a battery 86 or any other suitable source of electrical energy such as, for instance, a direct current or alternating current dynamo.

In this instance, the disc 83 is formed of metal and is adjustably mounted upon a disc 88 for angular adjustment around the axis of rotation of the shaft 15. Thus, the disc 83 is provided with arcuate slots 89 through which project screws 90 which are screw-threaded into the disc 88. Obviously, the screws 90 may be manipulated to have the heads thereof clamp the disc 83 against the disc 88 so as to prevent undesirable displacement of the disc 83 relative to the disc 88. As will be readily understood by those skilled in the art, the disc 83 may be angularly displaced around the axis of rotation of the shaft 16 to bring the brush 80 into any desired position or to reverse the direction of rotation of the armature 11.

The disc 88 is preferably formed from electrical insulation and is rigidly secured to the housing 10 by screws 82. The commutator and brush are enclosed within the cap or casing member 10a and the cap or casing member 10a is preferably provided with a leaf spring 95 which yieldingly engages one end of the shaft 15. It is not necessary to provide the leaf spring 95 in all instances but it will be readily understood that a thin film of oil generally tends to insulate the shaft 15 from the housing 10 and would also tend, to some extent, to insulate the shaft 15 from the disc 13. This would tend to interrupt the electrical current flowing from the ground or housing 10 through the shaft 15 to the disc 13 and thence through the cores of the electro-magnets to the windings thereof. However, with the provision of the spring 95 which frictionally engages the end of the shaft 15 a positive electrical connection between the ground or casing 10 and the windings of the electro-magnets will be had at all times. The shaft 15 may be employed to drive any suitable mechanism. Thus, it may be provided with a pinion 99, or the equivalent, at one end thereof to drive a gear, or the like.

The operation of the improved electric motor illustrated in Figs. 1 to 7, inclusive, is substantially as follows: Assuming that the brush 80 and the commutator are in the relative positions wherein they are illustrated in Figs. 3 and 7 so that the brush engages one of the three bars 62, one of the three bars 63 and one of the three bars 64, it is obvious that the electro-magnets 24, 27 and 22 will be energized. As the electro-magnet 22 is closer to the outer and inner field bars 51 and 41 than it is to the outer and inner field bars 52 and 42, respectively, the core 22b will be attracted to the field bars 51 and 42. For a like reason, the core 24b of the electro-magnet 24 will be attracted to the field bars 52 and 42 and the core 27b of the electro-magnet 27 will be attracted to the field bars 53 and 43 so that the armature 11 will rotate in a clockwise direction (Figs. 3 and 7). Such rotation of the armature 11 will immediately cause the brush 80 to engage one of the commutator bars 65 and the electro-magnet 25 will be energized. While this electro-magnet will then be substantially midway between the pair of field bars 52 and 42 and the pair of field bars 53 and 43, it is obvious that the action of the electro-magnets 22, 24 and 27 will cause the armature to continue to rotate in a clockwise direction (Figs. 3 and 7). As the commutator bar 65 engaged by the brush 80 advances along the brush, the electro-magnet 25 advances toward the field bars 52 and 42 until the core 25b of the electro-magnet 25 is attracted forcibly by the field bars 52 and 42 as compared with any attraction the field bars 43 and 53 may have with it. Then as the armature continues to rotate, the commutator bar 62 engaged by the brush 80 will advance into a position wherein it will leave the brush so that the electro-magnet 24 will be deenergized. This occurs when the electro-magnet is in a position wherein its core 24b is aligned substantially with the field bars 52 and 42. Of course, it is readily understood that as the armature continues to rotate, the field bars 52 and 42 will no longer attract the core 24b and it will be urged in a clockwise direction by the attraction of the pair of field bars 51 and 52, the pair of field bars 53 and 43 and the pair of field bars 52 and 43 for the cores of the electro-magnets 22, 27 and 25, respectively.

From the foregoing description of the operation of my improved motor, it is readily understood that each electro-magnet is energized three times during each revolution of the armature and that each time an electro-magnet is energized, it remains in this condition while it travels through an angle of substantially 60° which is one-half of the angular distance between the several sets or pairs of field bars and, therefore, it is obvious that each electro-magnet exerts its pull through a relatively large distance and that as three or four electro-magnets are energized at all times and are in different positions with respect to the field bars to which they are attracted, the torque produced will be relatively constant and will be relatively high. The timing of the engagement between the brush 80 and the various pairs of commutators can be adjusted by shifting or angularly displacing the disc 83 in the manner described above. If the brush 80 is angularly displaced through a sufficient angle, the direction of rotation of the armature will be reversed.

One of the more important features of my improved motor is the provision of both inner and outer field bars. The magnitude of the torque developed between any outer field bar and a core attached thereto varies during the travel of the core as does the torque developed between the same core and the corresponding inner field bar. But the two torques differ greatly as a rule and the outer and inner field bars may be arranged and constructed with respect to each other in such manner that the speed of the motor may be predetermined or in such manner that the resultant torque on the motor shaft will have certain desired characteristics, such as for example, a maximum average torque or a relatively constant torque. Thus, in Fig. 8, I have shown a motor which embodies my invention and has inner and outer field bars constructed and arranged differently than those shown in the motor illustrated in Figs. 1 to 7, inclusive. In all other respects, the motor illustrated in Fig. 8 is preferably substantially identical with the motor shown in Figs. 1 to 7, inclusive. In Fig. 8, the reference character 110 identifies the housing of the motor and the inner field bars are shown in dotted lines at 141, 142 and 143. One of the outer field bars is shown at 151, there being an outer field bar, of course, for each inner field bar. As in the construction employed in the motor illustrated in Figs. 1 to 7, inclusive, the field bars 141, 142 and 143 are spaced 120° from each other with respect to the axis of rotation of the shaft of the motor, which shaft is identified by the reference character 115. The direction of rotation of the armature is assumed to be clockwise (Fig. 8) in this instance. It will be noted that the outer field bar 151 is narrower than its cooperating inner field bar 141 and that a face 151a of the outer field bar 151 is not aligned with a corresponding face 141a of the inner field bar 141, the arrangement being such that the cores of the electromagnets will come into close proximity to the inner field bar 141 before they come into close proximity to the outer field bar 151. It is, of course, understood that the electromagnets of the motor shown in Fig. 8 are substantially identical to the electro-magnets of the motor illustrated in Figs. 1 to 7, inclusive. I have shown one of these electromagnets identified by the reference character 121 in a position wherein it is aligned, substantially, with the outer and inner field bars 151 and 141, respectively, the core 121b of the electro-magnet 121 being of substantially the same width as the field bar 151. The inner field bar 141 is preferably sufficiently wide so that when the core 151b is in the position wherein it is shown in Fig. 8, the right hand side of the bar 141 is aligned substantially with the right hand side of the core. The left hand side of the bar 141 projects beyond the left hand side of the core. This construction is employed so that as the armature rotates, the electro-magnets can be de-energized with advantage when they reach the point where the electro-magnet 121 is shown in dotted lines in Fig. 8 and prior to this instant, there will be no substantially back pull upon the core 121b by the inner field bar 141. Of course, with the construction shown in Fig. 8, a different torque will be obtained on the shaft of the motor than the torque obtained upon the shaft of the motor which is illustrated in Figs. 1 to 7, inclusive. This feature of the invention will be discussed more fully hereinafter.

Referring now to Fig. 9, I have illustrated another form of my invention embodied in a motor which is substantially identical with the motor illustrated in Figs. 1 to 7, inclusive, the only difference in the motor illustrated in Figs. 1 to 7, inclusive, and the motor shown in Fig. 9 being that the inner field bars are replaced by laminated field bars 241, 242 and 243 and outer field bars are replaced by laminated bars 251, 252 and 253. Alternate laminations 254a of each of the inner and outer field bars shown in Fig. 9 are formed of magnetic material while the intermediate laminations 254b are formed of non-magnetic material. Assuming that one of the electromagnets has rotated into a position wherein its core is aligned with a single one of the laminations 254a, it is obvious that continued rotation of the armature will not be against the action of the lines of flux flowing from the core to the lamination as the lines are not lengthened. However, the succeeding lamination 254a of magnetic material attracts the core and as the lines of flux tend to shorten themselves, the core is attracted to the next lamination 254a. This condition obtains until the core is balanced between the pair of field bars, at which time the electromagnet is deenergized in the same manner as the electro-magnets are deenergized in the motor shown in Figs. 1 to 7, inclusive.

In Fig. 10, I have shown still another form of the invention embodied in a motor which is substantially identical with the motor shown in Figs. 1 to 7, inclusive. But, in this instance, the cores of the several electro-magnets are laminated in the same manner as the field bars are in Fig. 9. Thus, each core of each of the electro-magnets shown in Fig. 10 comprise alternate laminations 354a of magnetic material, the intermediate laminations being identified by the reference characters 354b and being formed of non-magnetic material. The action of the cores of the electromagnets shown in Fig. 10 with respect to the inner and outer field bars associated therewith is substantially identical to the action between the cores of the electro-magnets shown in Fig. 9 with respect to the laminated field bars shown therein.

The magnetic lamination in Figs. 9 and 10 need not always be separated by non-magnetic laminations as the air and oxides between the magnetic laminations will give similar results.

Referring now to Figs. 11 and 12 wherein I have illustrated a motor which embodies still another form of the invention, the reference character 210 designates the housing of the motor and the reference character 211 refers in general to the armature thereof. The armature 211 is preferably constructed substantially identical with the armature of the motor illustrated in Figs. 1 to 7, inclusive, and the housing 210 is constructed substantially identical with the aforementioned housing 10 with the exception that twelve field bars are provided instead of six. In this arrangement there are six outer field bars and six inner field bars. The outer field bars are identified by the reference characters 251, 251a, 252, 252a, 253 and 253a. The inner field bars are identified by the reference characters 241, 241a, 242, 242a, 243 and 243a. Each of the outer field bars is paired with an inner field bar. Thus, the outer field bar 251 is paired with the inner field bar 241, the outer field bar 251a is paired with the inner field bar 241a, etc. The eight electro-magnets of the armature 211 are identified by the reference characters 221, 222, 223, 224, 225, 226, 227 and 228. The cores of the electro-magnets are identified by the reference characters 221b, 222b, 223b, 224b, 225b, 226b, 227b and 228b. Of course, each core is substantially I-shaped and comprises a central portion upon which the winding is mounted, this construction as stated above, being substantially identical to the construction shown in the motor illustrated in Figs. 1 to 7, inclusive.

The motor illustrated in Figs. 11 and 12 comprises a commutator which is illustrated diagrammatically in Fig. 12 and is constrained to rotate with the armature 11. The commutator comprises twenty-four bars, the bars being arranged in six sets.

Thus, there are six bars 261, six bars 262, six bars 263 and six bars 264. All the bars of each set are electrically connected to each other in substantially the same manner as the corresponding bars of the motor shown in Figs. 1 to 7, inclusive. In Fig. 12, I have shown all of the bars 261 electrically connected to each other, all of the bars 262 electrically connected to each other, all of the bars 263 electrically connected to each other and all the bars 264 electrically connected to each other. The bars 262 are connected to one terminal of each of the windings of the electro-magnets 223 and 227, the other terminals of these windings being connected to ground. The bars 263 are electrically connected to one terminal of each of the windings of the electro-magnets 224 and 228, the other terminals of these windings being connected to ground. The bars 264 are electrically connected to one terminal of each of the windings of the electro-magnets 221 and 225, the other terminals of these windings being connected to ground. And the bars 261 are electrically connected to one terminal of each of the windings of the electro-magnets 222 and 226, the other terminals of the windings being connected to ground.

One or more brushes engaging in the commutator may be provided. Thus, I have shown brushes 280 and 280a which are connected to one terminal of a source of electrical energy, the other terminal of the source of electrical energy being connected to ground. In this instance, the source of electrical energy is the battery 286 but it is readily understood that the battery may be replaced by a direct current or alternating current dynamo. It is apparent that a single brush may be employed if it is so desired or three, four, five or six brushes may be employed if it is so desired. One advantage of using a plurality of brushes is that there is less arcing and less wear of the brushes as they need not be urged with much force against the commutator bars. Other advantages are obvious to those skilled in the art.

It will be noted that the brushes 280 and 280a are contacting commutator bars 261 so that the electro-magnets 22 and 226 are energized. The brushes are preferably 15° in width and, therefore, it will be readily understood that each pair of electro-magnets remains energized through 30° when the brushes come in contact with the set of commutator bars to which the electro-magnets are connected. With the various parts positioned as they are shown diagrammatically in Fig. 12, it is apparent that the electro-magnets 222 and 226 have been energized through 15° of travel in a clockwise direction and that they will remain energized until they are aligned with the outer field bars 251 and 252a and the inner field bars 241 and 242a. The electro-magnets 221 and 225 are just about to become energized as the armature continues to rotate while the electro-magnets 223 and 227 have just been de-energized. With this arrangement, each electro-magnet is energizel six times for a complete revolution of the armature, the electro-magnet being energized through 180° of its travel as it is energized six times and each time through an arc of 30°. An important feature of the construction shown in Figs. 11 and 12 is that diametrically disposed electro-magnets are energized at the same time and, therefore, tend to balance each other with respect to their action on the shaft. This will make the armature run smoothly with a minimum of noise, vibration and wear on the shaft.

Referring now to Fig. 13, I have illustrated diagrammatically the torques developed in a motor which is constructed in a manner illustrated in Figs. 11 and 12. In Fig. 13, the degrees of travel through which the armature is rotating is indicated by the abscissæ and the torque developed on the shaft of the motor is indicated by the ordinates. The curve 300 represents the torque exerted upon the shaft by the action between the electro-magnets and the inner field bars, the outer field bars having been removed from the motor. The curve 301 represents the torque exerted upon the shaft by the electro-magnets and the outer field bars, the inner field bars having been removed from the motor. The combined torque exerted upon the shaft by the electro-magnets and the inner and outer field bars is represented by the curve 302. It is readily understood, of course, that the curve 302 is substantially the sum of the curves 300 and 301. Of course, as except for the moments that the brush or brushes contact only with individual sets of bars, there are two pairs of electro-magnets energized and the torque curves of the electro-magnets will overlap each other. Curves shown in Fig. 13 are those developed by a single pair of electro-magnets.

In Fig. 14, the overlapping of the portions of two pairs of electro-magnets is illustrated. In this instance, only the inner field bars were employed. Thus, curve 300a represents the final torque exerted upon the shaft by one pair of electro-magnets while the curve 300b represents the initial torque exerted by another pair of electro-magnets which have been energized 15° later than the electro-magnets which developed the torque represented by the curve 300a. The resultant torque of the two pairs of electro-magnets is represented by the dotted line 303 and is substantially the sum of the torques represented at 300a and 300b.

Referring now to Fig. 15, only the outer field bars were employed and the curve 301a represents the final torque developed by one pair of electro-magnets while the curve 301b represents the initial torque developed by the pair of electro-magnets which were energized 15° later than the pair of electro-magnets which produced the torque 301a. The dotted curve 305 represents the resultant torque and is substantially the sum of the torques represented at 301a and 301b.

Fig. 16 illustrates the torque developed when both inner and outer field bars were used. The curve 302a represents the final torque developed by one pair of electro-magnets while the curve 302b represents the initial torque developed by the pair of electro-magnets which were energized 15° later than the pair that produced the torque 302a. The resultant torque is represented by the dotted line 306.

A comparison of Figs. 14, 15 and 16 will indicate that it is extremely advantageous to employ both inner and outer field bars as the torque developed when outer and inner field bars are employed instead of inner field bars alone or outer field bars alone is relatively high, utilizing substantially the same amount of current at the same voltage.

The curves shown in Fig. 17 demonstrate the manner in which the characteristics of the motor may be varied by varying the relationship between the outer and inner field bars in a manner similar to that illustrated in Fig. 8. The curve 310 illustrates the torque developed by one pair of electro-magnets when both inner and outer field bars were employed and the outer field bars were arranged in a certain relationship. The same electro-magnets produce a torque which is represented by the curve 311 when this relationship between the outer field bars was changed. It will be noted that while the torque represented by the curve 311 does not attain the maximum value of the torque represented by the curve 310, yet it was exerted over a larger number of degrees and the result would be a relatively constant torque exerted upon the shaft of the motor. It is readily understood that the relative position of the outside and inside field bars and the sizes thereof may be varied with respect to the number of coils employed and with respect to the number of field bars employed and the diameter of the armature so that a relatively uniform torque may be produced and a relatively large minimum starting torque may be provided. As set forth in the description of the construction illustrated in Fig. 8, the relative positions of the inner and outer field bars may be varied to influence the speed and torque of the motor.

It is readily understood that the electro-magnets, described above, may be positioned on the stationary member of a motor and that the field bars may be positioned on the rotary member, such construction being a mere reversal of parts.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described, in combination a rotatable member comprising a plurality of electro-magnets equidistantly spaced from its axis of rotation, each electro-magnet comprising a winding and a pole portion adjacent each end of the winding a stationary member comprising a plurality of bars of magnetic material, a plurality of said bars being positioned outside of and around the path travelled by said electro-magets and the remainder of said bars being positioned around and inside of the path travelled by said electro-magnets, each bar comprising a pole portion adjacent each end thereof adapted to magnetically attract the said pole portions of the electro-magnet, and the pole portions of the electro-magnets having an outwardly radially and an inwardly radially directed pole face disposed to rotate adjacent respective pole portions of the outer and inner bars and means for energizing said electro-magnets in a predetermined manner.

2. In a device of the kind described, in combination a plurality of electro-magnets equidistantly spaced from its axis of rotation, and comprising each a winding and a pole portion adjacent each end of the winding, a stationary member comprising a plurality of bars of magnetic material, a plurality of said bars being positioned outside of and around the path travelled by said electro-magnets and the remainder of said bars being positioned around and inside of the path travelled by said electro-magnets, and each bar comprising a pole portion adjacent each end thereof adapted to magnetically attract a said pole portion of the electro-magnet and the pole portions of the electro-magnets having an outwardly radially and an inwardly radially directed pole face disposed to rotate adjacent respective pole portions of the outer and inner bars, the number of bars outside of said path being equal to the number of bars inside of said path, and means for energizing said electro-magnets in a predetermined manner.

3. In a device of the kind described, in combination a rotatable member comprising a plurality of electro-magnets equidistantly spaced from its axis of rotation, and comprising each a winding and a pole portion adjacent each end of the winding, a stationary member comprising a plurality of bars of magnetic material, a plurality of said bars being positioned outside of and around the path travelled by said electro-magnets and the remainder of said bars being positioned around and inside of the path travelled by said electro-magnets, and each bar comprising a pole portion adjacent each end thereof adapted to magnetically attract a pole portion of the electro-magnets and the pole portions of the electro-magnets having an outwardly radially and an inwardly radially directed pole face disposed to rotate adjacent respective pole portions of the outer and inner bars, said bars disposed outside of said path being radially aligned with the bars disposed inside of said path, and means for energizing said electro-magnets in a predetermined manner.

4. In a device of the kind described, the combination with a rotatable member comprising a plurality of electro-magnets equidistantly spaced from its axis of rotation, of a stationary member comprising a plurality of bars of magnetic material, a plurality of said bars being positioned outside of and around the path travelled by said electro-magnets and the remainder of said bars being positioned around and inside of the path traveled by said electro-magnets, the bars outside of said path being offset circumferentially with respect to the bars disposed inside of said path, and means for energizing said electro-magnets in a predetermined manner.

5. In a device of the kind described, in combination a rotatable member comprising a plurality of electro-magnets equidistantly spaced from its axis of rotation, and comprising each a winding and a pole portion adjacent each end of the winding, a stationary member comprising a plurality of bars of magnetic material, a plurality of said bars being positioned outside of and around the path travelled by said electro-magnets and the remainder of said bars being positioned around and inside of the path travelled by said electromagnets, and each bar comprising a pole portion adjacent each end thereof adapted to magnetically attract a said pole portion of the electro-magnets, and the pole portions of the electro-magnets having an outwardly radially and an inwardly radially directed pole face disposed to rotate adjacent respective pole portions of the outer and inner bars, the number of bars disposed outside of said path being equal to the number of bars disposed inside of said path and being unequal to the number of electro-magnets, and means for energizing said electro-magnets in a predetermined manner.

6. In a device of the kind described, in combination a rotatable member comprising a plurality of electro-magnets having cores equidistantly spaced from the axis of rotation, and comprising each a winding and a pole portion adjacent each end of the winding, a stationary member comprising a plurality of bars of magnetic material, the effective length of said bars with respect to said cores being substantially equal to the length of said cores, a plurality of said bars being positioned outside of and around the path travelled by said electro-magnets and the remainder of said bars being positioned around and inside of the path travelled by said electro-magnets, and each bar comprising a pole portion adjacent each end thereof adapted to magnetically attract a said pole portion of the electro-magnets, the pole portions of the bars and of the electro-magnets having radially alignable faces and the flux path therebetween being generally radial when in a predetermined relative rotative position, and means for energizing said electro-magnets in a predetermined manner.

7. In a device of the kind described, in combination a rotatable member comprising a plurality of electro-magnets having cores equidistantly spaced from the axis of rotation, and comprising each a winding and a pole portion adjacent each end of the winding, a stationary member comprising a plurality of bars of magnetic material, the effective length of said bars with respect to said cores being substantially equal to the length of said cores, a plurality of said bars being positioned outside of and around the path travelled by said electro-magnets and the remainder of said bars being positioned around and inside of the path travelled by said electro-magnets, and each bar comprising a pole portion adjacent each end thereof adapted to magnetically attract a said pole portion of the electro-magnets, the pole portions of the bars and of the electro-magnets having radially alignable faces and the flux path therebetween being generally radial when in a predetermined relative rotative position, the number of bars disposed outside of said path being equal to the number of bars disposed inside of said path, and means for energizing said electro-magnets in a predetermined manner.

8. In a device of the kind described, in combination a rotatable member comprising a plurality of electro-magnets having cores equidistantly spaced from the axis of rotation, and comprising each a winding and a pole portion adjacent each end of the winding, a stationary member comprising a plurality of bars of magnetic material, the effective length of said bars with respect to said cores being substantially equal to the length of said cores, a plurality of said bars being positioned outside of and around the path travelled by said electro-magnets and the remainder of said bars being positioned around and inside of the path travelled by said electro-magnets, the bars positioned outside of said path being radially aligned with the bars disposed inside of said path, and each bar comprising a pole portion adjacent each end thereof adapted to magnetically attract a said pole portion of the electro-magnets, the pole portions of the bars and of the electro-magnets having radially alignable faces and the flux path therebetween being generally radial when in a predetermined relative rotative position, and means for energizing said electro-magnets in a predetermined manner.

9. In a device of the kind described, the combination of a rotatable member comprising a plurality of electro-magnets having cores equidistantly spaced from the axis of rotation, of a stationary member comprising a plurality of bars of magnetic material, the effective length of said bars with respect to said cores being substantially equal to the length of said cores, a plurality of said bars being positioned outside of and around the path travelled by said electro-magnets and the remainder of said bars being positioned around and inside of the path travelled by said electro-magnets, the bars disposed outside of said path being offset with respect to the bars disposed inside of said path, and means for energizing said electro-magnets in a predetermined manner.

10. In a rotary motor, a frame, a plurality of outer field bars and a plurality of inner field bars supported on the frame and disposed substantially radially in radially spaced pairs of outer and inner bars and substantially parallel to a central axis, a rotor comprising a coaxial rotor shaft rotatably mounted on the frame, a plurality of electro-magnets mounted on the shaft to rotate therewith between the pairs of bars, the opposite poles of the electro-magnets adapted to attract opposing ends of the bars upon generally radially alignable air-gap faces.

11. In a rotary motor, a frame, a plurality of outer field bars and a plurality of inner field bars supported on the frame and disposed substantially radially in radially spaced pairs of outer and inner bars and substantially parallel to a central axis, a rotor comprising a coaxial rotor shaft rotatably mounted on the frame, a plurality of electro-magnets mounted on the shaft to rotate therewith between the pairs of bars, the opposite poles of the electro-magnets adapted to attract opposing pole ends of the bars, the poles of the magnets and bars being radially alignable and the flux path therebetween being generally radial when in predetermined relative rotative position, one set of bars having poles laminated in the direction to cause the magnetic flux to leave the pole from successive laminations of the pole face progressively thereover during rotation of the electro-magnetic pole relative thereto.

In witness whereof, I hereunto subscribe my name this 14th day of January, A. D. 1929.

THEODORE J. SMULSKI.